(12) United States Patent
Hottovy (10) Patent No.: US 8,344,078 B2
(45) Date of Patent: Jan. 1, 2013

(54) CONTINUOUS TAKE OFF TECHNIQUE AND PRESSURE CONTROL OF POLYMERIZATION REACTORS

(75) Inventor: John D. Hottovy, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 98 days.

(21) Appl. No.: 12/785,333

(22) Filed: May 21, 2010

(65) Prior Publication Data

US 2011/0288247 A1 Nov. 24, 2011

(51) Int. Cl.
*C08F 2/00* (2006.01)
*C08F 210/00* (2006.01)
*C08F 110/02* (2006.01)
*B01J 19/00* (2006.01)
*B01J 19/18* (2006.01)
*F01N 3/20* (2006.01)

(52) U.S. Cl. .......... 526/64; 526/348; 526/352; 422/131; 422/105; 422/132

(58) Field of Classification Search .................. 526/64, 526/348, 352; 422/131, 105, 132
See application file for complete search history.

(56) References Cited

U.S. PATENT DOCUMENTS

| | | | |
|---|---|---|---|
| 4,211,863 A | 7/1980 | McDaniel et al. | |
| 4,654,801 A | 3/1987 | Stewart et al. | |
| 4,676,870 A | 6/1987 | Stewart et al. | |
| 4,754,007 A | 6/1988 | Pullukat et al. | |
| 5,183,866 A | 2/1993 | Hottovy | |
| 5,387,659 A | 2/1995 | Hottovy et al. | |
| 5,391,654 A | 2/1995 | Ahvenainen et al. | |
| 5,565,175 A | 10/1996 | Hottovy et al. | |
| 5,986,021 A | 11/1999 | Hokkanen et al. | |
| 6,042,790 A | 3/2000 | Hottovy et al. | |
| 6,051,631 A | 4/2000 | Hottovy | |
| 6,114,501 A | 9/2000 | Hottovy et al. | |
| 6,239,235 B1 | 5/2001 | Hottovy et al. | |
| 6,239,300 B1 | 5/2001 | Stouffer et al. | |
| 6,262,191 B1 | 7/2001 | Hottovy et al. | |
| 6,355,741 B1 | 3/2002 | Marechal | |
| 6,743,869 B2 | 6/2004 | Franklin, III et al. | |
| 6,806,324 B2 | 10/2004 | Hottovy et al. | |
| 6,815,511 B2 | 11/2004 | Verser et al. | |
| 6,858,682 B2 | 2/2005 | Kendrick et al. | |

(Continued)

FOREIGN PATENT DOCUMENTS

EP 2055 725 A1 * 5/2009
(Continued)

OTHER PUBLICATIONS

U.S. Appl. No. 10/251,662, filed Sep. 20, 2002, Kufeld et al.

(Continued)

*Primary Examiner* — William Cheung
(74) *Attorney, Agent, or Firm* — Fletcher Yoder (57) ABSTRACT

Techniques and systems for producing a polyolefin using reactors in series are described. Described embodiments include techniques and systems for polymerizing a monomer in a first polymerization reactor to form a first polyolefin, discharging a first slurry continuously from the first polymerization reactor to a second polymerization reactor, and discharging a second slurry continuously from the second polymerization reactor. Using continuous take-off devices disposed on either or both reactors, pressure control may be attained such that the rate of transfer between and withdrawal from both reactors are within a desired range.

12 Claims, 6 Drawing Sheets

U.S. PATENT DOCUMENTS

| | | |
|---|---|---|
| 6,926,868 B2 | 8/2005 | Kendrick et al. |
| 6,967,230 B2 | 11/2005 | Hottovy et al. |
| 7,005,485 B2 | 2/2006 | Burns et al. |
| 7,014,821 B2 | 3/2006 | Hottovy et al. |
| 7,015,289 B2 | 3/2006 | Hottovy et al. |
| 7,033,545 B2 | 4/2006 | Kufeld et al. |
| 7,037,980 B2 | 5/2006 | Stacy et al. |
| 7,109,290 B2 | 9/2006 | McElvain et al. |
| 7,179,426 B2 | 2/2007 | Hottovy et al. |
| 7,517,947 B2 | 4/2009 | McElvain et al. |
| 7,524,904 B2 | 4/2009 | Verser et al. |
| 7,547,750 B2 | 6/2009 | McElvain et al. |
| 7,615,596 B2 | 11/2009 | Burns et al. |
| 7,645,841 B2 | 1/2010 | Shaw et al. |
| 2002/0187081 A1 | 12/2002 | Hottovy et al. |
| 2003/0012705 A1 | 1/2003 | Hottovy et al. |
| 2003/0023010 A1 | 1/2003 | Hottovy et al. |
| 2003/0027944 A1 | 2/2003 | Hottovy et al. |
| 2003/0050409 A1 | 3/2003 | Hottovy et al. |
| 2003/0083444 A1 | 5/2003 | McElvain et al. |
| 2003/0092856 A1 | 5/2003 | Hottovy et al. |
| 2004/0116625 A1 | 6/2004 | Hottovy et al. |
| 2004/0122187 A1* | 6/2004 | Verser et al. .............. 526/64 |
| 2004/0136881 A1 | 7/2004 | Verser et al. |
| 2004/0192860 A1 | 9/2004 | Hottovy et al. |
| 2005/0095176 A1 | 5/2005 | Hottovy |
| 2006/0063896 A1 | 3/2006 | McElvain et al. |
| 2006/0100591 A1 | 5/2006 | Alheidt et al. |
| 2006/0159595 A1 | 7/2006 | Hottovy et al. |
| 2009/0326168 A1 | 12/2009 | Burns et al. |
| 2010/0056707 A1 | 3/2010 | Hottovy et al. |
| 2010/0056732 A1 | 3/2010 | McElvain et al. |

FOREIGN PATENT DOCUMENTS

| | | |
|---|---|---|
| EP | 2055725 A1 | 5/2009 |
| JP | 56100632 | 8/1981 |
| WO | WO 96/34895 | 7/1996 |
| WO | WO2004/024780 A1 | 3/2004 |
| WO | WO 2006/019494 | 2/2006 |
| WO | WO 2006/028778 | 3/2006 |
| WO | WO2010/027912 A1 | 3/2010 |

OTHER PUBLICATIONS

U.S. Appl. No. 10/660,824, filed Sep. 12, 2003, Hottovy et al.
U.S. Appl. No. 10/660,990, filed Sep. 12, 2003, Hottovy et al.
U.S. Appl. No. 10/663,322, filed Sep. 16, 2003, Hottovy et al.
U.S. Appl. No. 10/668,857, filed Sep. 23, 2003, Verser et al.
U.S. Appl. No. 10/699,095, filed Oct. 31, 2003, Verser et al.
U.S. Appl. No. 10/699,151, filed Oct. 31, 2003, Hottovy.
U.S. Appl. No. 10/700,006, filed Nov. 3, 2003, Verser et al.
U.S. Appl. No. 10/849,393, filed May 19, 2004, Hottovy et al.
U.S. Appl. No. 10/928,047, filed Aug. 27, 2004, Shaw et al.
U.S. Appl. No. 11/213,374, filed Aug. 26, 2005, McElvain et al.
U.S. Appl. No. 12/198,658, filed Aug. 26, 2008, McElvain et al.
U.S. Appl. No. 12/204,566, filed Sep. 4, 2008, Hottovy et al.
U.S. Appl. No. 12/699,729, filed Feb. 3, 2010, Hottovy et al.
Bryan, Kathryn B., et al. "A Private Report by the Process Economics Program." *SRI International* (Aug. 1993) Report No. 128A, 7-1, 7-3, Figure 7.1.
Takeda, Makota, et al. "Optimal-Grade Transition Strategies for Multistage Polyolefin Reactors." *AIChE Journal* (Aug. 1999) vol. 45, No. 8.
International Application PCT/US2011/036434 Search Report dated Jul. 26, 2011.

* cited by examiner

CONTINUOUS TAKE OFF TECHNIQUE AND PRESSURE CONTROL OF POLYMERIZATION REACTORS

BACKGROUND

The present disclosure relates generally to polyolefin production and, more specifically, to techniques and systems that employ two or more polymerization reactors in a polyolefin reactor system.

This section is intended to introduce the reader to aspects of art that may be related to aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into various everyday items. For example, polyolefin polymers, such as polyethylene, polypropylene, and their copolymers, are used for retail and pharmaceutical packaging, food and beverage packaging (such as juice and soda bottles), household containers (such as pails and boxes), household items (such as appliances, furniture, carpeting, and toys), automobile components, pipes, conduits, and various industrial products.

Polyolefins may be produced from various monomers, such as ethylene, propylene, butene, pentene, hexene, octene, decene, and other building blocks. If one monomer is used for polymerization, the polymer is referred to as a homopolymer, while incorporation of different monomers creates a copolymer or terpolymer, and so on. Monomers may be added to a polymerization reactor, such as a liquid-phase reactor or a gas-phase reactor, where they are converted to polymers. In the liquid-phase reactor, an inert hydrocarbon, such as isobutane, propane, n-pentane, i-pentane, neopentane, and/or n-hexane, may be utilized as a diluent to carry the contents of the reactor. A catalyst may also be added to the reactor to facilitate the polymerization reaction. An example of such a catalyst is a chromium oxide containing hexavalent chromium on a silica support. Unlike the monomers, catalysts are generally not consumed in the polymerization reaction.

As polymer chains develop during polymerization, solid particles known as "fluff" or "flake" or "powder" are produced. The fluff may possess one or more melt, physical, rheological, and/or mechanical properties of interest, such as density, melt index (MI), melt flow rate (MFR), copolymer content, comonomer content, modulus, and crystallinity. Different fluff properties may be desirable depending on the application to which the polyolefin fluff or subsequently pelletized fluff is to be applied. Control of the reaction conditions within the reactor, such as temperature, pressure, chemical concentrations, polymer production rate, catalyst type, and so forth, may affect the fluff properties.

In some circumstances, in order to achieve certain desired polymer characteristics, the overall polymerization conditions may require that more than one reactor be employed, with each reactor having its own set of conditions. Such polymers may be multimodal polymers, where at least two polymers, each having a different molecular weight fraction, are combined into one polymer product. In a general sense, a polyolefin produced in each reactor will be suspended in a diluent to form a product slurry. The reactors may be connected in series, such that the product slurry from one reactor may be transferred to a subsequent reactor, and so forth, until a polymer is produced with the desired set of characteristics. For example, a bimodal polymer may be produced by two reactors in series; a trimodal polymer may need three, and so on.

In some instances, the flow of slurry that is transferred from one reactor to the next may be unstable (e.g., a non-uniform distribution of solids throughout the slurry), resulting in "salting out" of solids from the diluent. Such a situation may cause clogging during transfer, or may cause a reactor to clog, resulting in reactor fouling. To the extent that clogging may result in deviations from a set of desired reaction conditions, the polymer product produced within a reactor may not meet the desired specifications; that is, the product may be "off-spec." As may be appreciated, the fouling of one or more reactors within a series may cause the ultimate polyolefin that is produced by the system to be significantly off-spec. In extreme or runaway fouling situations, control of the process may be lost entirely, and a portion of the system employing the reactors in series may become plugged with polymer, requiring significant downtime (e.g., one to three weeks) to clear. Unfortunately, during this time, the polymerization system may not be operated and polyolefin may not be produced. Thus, it may be desirable to avoid fouling by preventing reactor clogging and maintaining stable slurries during transfer. Streamlining such a process employing multiple reactors in series may result in increased efficiency, less system downtime, and increased overall product capacity.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

I. Polyolefin Production Process—An Overview

Products made from polyolefins have become increasingly prevalent in society as plastic products. One benefit of these polyolefins is that they are generally non-reactive when put in contact with various goods or products. In particular, plastic products from polyolefins are used for retail and pharmaceutical packaging (such as display bags, bottles, and medication containers), food and beverage packaging (such as juice and soda bottles), household and industrial containers (such as pails, drums and boxes), household items (such as appliances, furniture, carpeting, and toys), automobile components, fluid, gas and electrical conduction products (such as cable wrap, pipes, and conduits), and various other industrial and consumer products. The wide variety of residential, commercial and industrial uses for polyolefins has translated into a substantial demand for raw polyolefin which can be extruded, injected, blown or otherwise formed into a final consumable product or component.

In the production of polyolefins, polymerization reactors, which polymerize monomers into polyolefins, and extruders, which convert the polyolefins into polyolefin pellets, are typically components of polymerization systems undergoing continuous operation. However, a variety of both continuous and batch systems may be employed throughout the polyolefin process. Turning now to the drawings, and referring initially to FIG. 1, a block diagram depicts an exemplary manufacturing process 10 for producing polyolefins, such as polyethylene homopolymer, copolymer, and/or terpolymer. Various suppliers 12 may provide reactor feedstocks 14 to the manufacturing system 10 via pipelines, trucks, cylinders, drums, and so forth. The suppliers 12 may comprise off-site and/or on-site facilities, including olefin plants, refineries, catalyst plants, and the like. Examples of possible feedstocks 14 include olefin monomers and comonomers (such as ethylene, propylene, butene, hexene, octene, and decene), diluents (such as propane, isobutane, n-hexane, and n-heptane), chain transfer agents (such as hydrogen), catalysts (such as Ziegler catalysts, Ziegler-Natta catalysts, chromium catalysts, and metallocene catalysts), co-catalysts (such as triethylaluminum alkyl, triethylboron, and methyl aluminoxane), and other additives. In the case of ethylene monomer, exemplary ethylene feedstock may be supplied via pipeline at approximately 800-1450 pounds per square inch gauge (psig) at 45-65° F. Exemplary hydrogen feedstock may also be supplied via pipeline, but at approximately 900-1000 psig at 90-110° F. Of course, a variety of supply conditions may exist for ethylene, hydrogen, and other feedstocks 14.

A. Feed System

Figure 1:
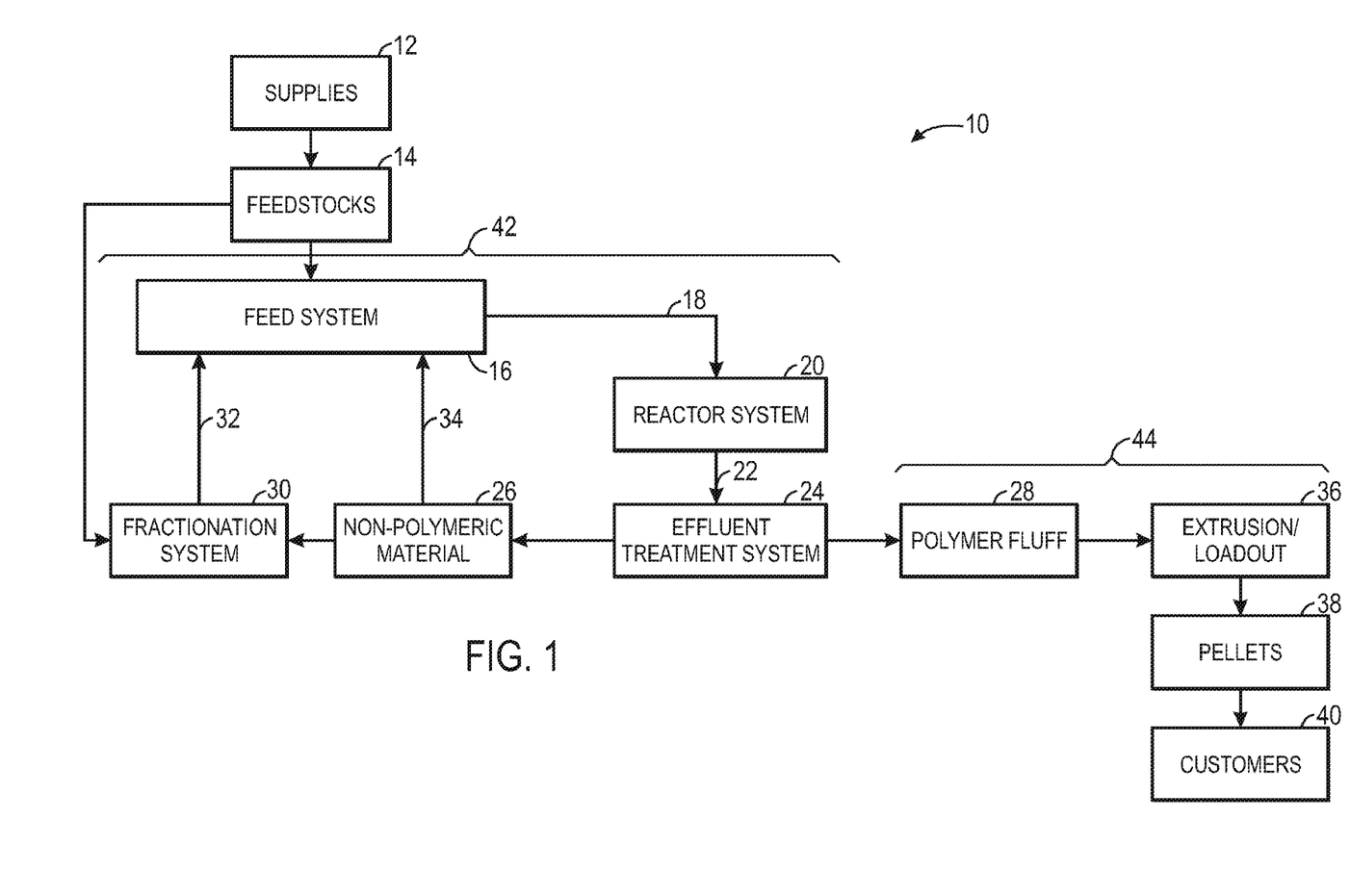
FIG. 1 is a block flow diagram depicting a polyolefin manufacturing system for the continuous production of polyolefins in accordance with an embodiment of the present techniques.

The suppliers 12 typically provide the feedstocks 14 to a reactor feed system 16, where the feedstocks 14 may be stored, such as in monomer storage and feed tanks, diluent vessels, catalyst tanks, co-catalyst cylinders and tanks, and so forth. In the feed system 16, the feedstocks 14 may be treated or processed prior to their introduction as feed streams 18 into the polymerization reactors of a reactor system 20. For example, feedstocks 14, such as monomer, comonomer, and diluent, may be sent through treatment beds (e.g., molecular sieve beds, aluminum packing, etc.) to remove catalyst poisons in the feed system 16. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor or reactors within reactor system 20 being fed. Furthermore, in operation, the feed system 16 may also store, treat, and meter recovered reactor effluent for recycle to the reactor system 20. Indeed, operations in the feed system 16 generally receive both the feedstock 14 and recovered reactor effluent streams. It should be noted that typically only a relatively small amount of fresh make-up diluent as feedstock 14 is utilized, with a majority of the diluent fed to the polymerization reactor(s) recovered from the reactor effluent.

The feed system 16 may also prepare or condition other feedstocks 14, such as catalysts, for addition to the polymerization reactors. For example, a catalyst may be activated, as described below, and then mixed with diluent (e.g., isobutane or hexane) or mineral oil in catalyst preparation tanks. As described above, catalyst may also be recovered from the reactor effluent. In total, the feedstocks 14 and recovered reactor effluent are processed in the feed system 16 and fed as feed streams 18 (e.g., streams of monomer, comonomer, diluent, catalysts, co-catalysts, hydrogen, additives, or combinations thereof) to the reactor system 20. Further, the feed system 16 typically provides for metering and controlling the addition rate of the feedstocks 14 into the reactor system 20 to maintain the desired reactor stability and/or to achieve the desired polyolefin properties or production rate.

B. Reactor System

The reactor system 20 may have one or more reactor vessels, such as liquid-phase reactors, gas-phase reactors, or a combination thereof. Multiple reactors may be arranged in series, in parallel, or in any other suitable combination or configuration. In polymerization reactor vessels, one or more olefin monomers are polymerized to form a product containing polymer particulates, typically called fluff or granules. The fluff may possess one or more melt, physical, rheological, and/or mechanical properties of interest, such as density, melt index (MI), melt flow rate (MFR), copolymer or comonomer content, modulus, and crystallinity. The reaction conditions, such as temperature, pressure, flow rate, mechanical agitation, product takeoff, component concentrations, polymer production rate, and so forth, may be selected to achieve the desired fluff properties.

In addition to the one or more olefin monomers, a catalyst that facilitates polymerization of the monomer is typically added to the reactor. The catalyst may be a particle suspended in the fluid medium within the reactor. In general, Ziegler catalysts, Ziegler-Natta catalysts, metallocenes, and other well-known polyolefin catalysts, as well as co-catalysts, may be used. An example of such a catalyst is a chromium oxide catalyst containing hexavalent chromium on a silica support. Increased catalyst conversion in the feed system 16 may also enable a higher MI potential in the reactor system 20.

In addition to the feedstock 14 described above, diluent may be fed into a liquid-phase reactor. The diluent may be an inert hydrocarbon that is a liquid or a supercritical fluid at reaction conditions, depending on the desired properties of the polymer fluff or the slurry. The diluent may include isobutane, propane, n-pentane, i-pentane, neopentane, n-hexane, cyclohexane, cyclopentane, methylcyclopentane, ethylcyclohexane, and the like, or combinations thereof. The purpose of the diluent is generally to suspend the catalyst particles and polymer within the reactor. It should be noted that the temperature and pressure within the reactor may affect the solubility properties of the diluent. For example, at certain temperatures and/or pressures, the diluent may be a liquid or a supercritical fluid. Indeed, in some embodiments, the reactor may be kept at or above a critical temperature, a critical pressure, or a combination of both, of the reactor contents.

For example, conditions of the reactor may be such that the diluent and all other polymerization components (such as the feedstock 14) within the reactor are supercritical fluids. Under such supercritical conditions, there may be a substantial absence of a thermodynamic transition between the liquid and gas phase of the polymerization components. The supercritical conditions at which one or more reactors of the reactor system 20 is maintained may allow higher rates of mixing, higher flow rates, faster dispersion, and so forth within the reactor compared to conditions in which the diluent is a liquid.

As an example, in one implementation, the reactor may utilize propane as diluent, and may be operated at or above the critical point of the total reactor contents. Accordingly, for example, the propane diluent and other polymerization components are maintained as a supercritical fluid. It should be noted that a variety of factors may affect the critical temperature and pressure of the reactor contents. Such factors may include but are not limited to the relative concentrations of the polymerization components, the amount of impurities present within the polymerization components, such as the amount of unbranched hydrocarbon in a branched hydrocarbon diluent, other catalyst poisons such as water, $CO_2$ and $O_2$, and so on. Therefore, it may be desirable to monitor the nature of the reactor contents to ascertain if the reactor is operating at supercritical conditions. In other embodiments, the reactor may be operated at semi-supercritical conditions, such as below the critical pressure but at or above the critical temperature, or below the critical temperature but above the critical pressure of the reactor contents.

A motive device may be present within the reactor in the reactor system 20. For example, within a liquid-phase reactor, such as a loop slurry reactor, an impeller may create a turbulent mixing zone within the fluid medium. The impeller may be driven by a motor to propel the fluid medium as well as any catalyst, polyolefin fluff, or other solid particulates suspended within the fluid medium, through the closed loop of the reactor. Similarly, within a gas-phase reactor, such as a fluidized bed reactor or plug flow reactor, one or more paddles or stirrers may be used to mix the solid particles within the reactor.

C. Effluent Treatment and Feed Recovery

A discharge 22 of the reactors within the reactor system 20 may include the polymer fluff as well as non-polymer components, such as diluent, unreacted monomer/comonomer, and residual catalyst. After leaving the reactor system 20, the discharge 22 may be subsequently processed, such as by an effluent treatment system 24, to separate non-polymer components 26 (e.g., diluent, unreacted monomer, and catalyst) from polymer fluff 28.

The recovered non-polymer components 26 may be processed, such as by a fractionation system 30, to remove undesirable heavy and light components. Fractionated product streams 32 may then be returned to the reactor system 20 via the feed system 16. In addition, some or all of the non-polymer components 26 may recycle more directly to the feed system 16 via a non-fractionated product stream 34, bypassing the fractionation system 30. Additionally, in some embodiments, the fractionation system 30 may perform fractionation of the feedstocks 14 before introduction into the feed system 16. For example, monomer components may be separated from diluent components, such that any one or combination of polymerization components may be controllably fed into the reactor system 20.

The polymer fluff 28 may be further processed within the effluent treatment system 24 and/or in an extrusion/loadout system 36, as described below. Although not illustrated, polymer granules and/or active residual catalyst intermediate in the effluent treatment system 24 may be returned to the reactor system 20 for further polymerization, such as in a different type of reactor or under different reaction conditions.

D. Extrusion/Loadout System

In the extrusion/loadout system 36, the polymer fluff 28 is typically extruded to produce polymer pellets 38 with the desired mechanical, physical, and melt characteristics. Extruder feed may contain additives, such as UV inhibitors and peroxides, which are added to the polymer fluff 28 to impart desired characteristics to the extruded polymer pellets 38. An extruder/pelletizer within the extrusion/loadout system 36 receives the extruder feed, containing the polymer fluff 28 and whatever additives have been added. The extruder/pelletizer heats and melts the extruder feed which then may be extruded (e.g., via a twin screw extruder) through a pelletizer die of the extrusion/loadout system 36 under pressure to form polyolefin pellets 38. Such pellets 38 may be cooled in a water system disposed at or near the discharge of the extruder/pelletizer.

In general, the polyolefin pellets may then be transported to a product load-out area where the pellets may be stored, blended with other pellets, and/or loaded into railcars, trucks, bags, and so forth, for distribution to customers 40. In the case of polyethylene, the pellets 38 shipped to the customers 40 may include low density polyethylene (LDPE), linear low density polyethylene (LLDPE), medium density polyethylene (MDPE), high density polyethylene (HDPE), and enhanced polyethylene. The various types and grades of polyethylene pellets 38 may be marketed, for example, under the brand names Marlex® polyethylene or MarFlex™ polyethylene of Chevron-Phillips Chemical Company, LP, of The Woodlands, Tex., USA.

The polymerization and effluent treatment portions of the polyolefin manufacturing process 10 may be called the "wet" end 42 or "reaction" side of the process 10, while the extrusion/loadout portion of the polyolefin process 10 may be called the "dry" end 44 or "finishing" side of the polyolefin process 10.

E. Customers, Applications, and End-Uses

The produced polyolefin (e.g., polyethylene) pellets 38 may be used in the manufacture of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys and an array of containers and plastic products. Ultimately, the products and components formed from the pellets 38 may be further processed and assembled for distribution and sale to the consumer. For example, a polyethylene milk bottle may be filled with milk for distribution to the consumer, or the fuel tank may be assembled into an automobile for distribution and sale to the consumer.

To form end-products or components from the pellets 38, the pellets 38 are generally subjected to further processing, such as blow molding, injection molding, rotational molding, blown film, cast film, extrusion (e.g., sheet extrusion, pipe and corrugated extrusion, coating/lamination extrusion, etc.), and so on. Blow molding is a process used for producing hollow plastic parts. The process typically employs blow molding equipment, such as reciprocating screw machines, accumulator head machines, and so on. The blow molding process may be tailored to meet the customer's needs, and to manufacture products ranging from the plastic milk bottles to the automotive fuel tanks mentioned above. Similarly, in injection molding, products and components may be molded for a wide range of applications, including containers, food and chemical packaging, toys, automotive, crates, caps and closures, to name a few.

Extrusion processes may also be used. Polyethylene pipe, for example, may be extruded from polyethylene pellet resins and used in an assortment of applications due to its chemical resistance, relative ease of installation, durability and cost advantages, and the like. Indeed, plastic polyethylene piping has achieved significant use for water mains, gas distribution, storm and sanitary sewers, interior plumbing, electrical conduits, power and communications ducts, chilled water piping, well casing, to name a few applications. In particular, high-density polyethylene (HDPE), which generally constitutes the largest volume of the polyolefin group of plastics used for pipe, is tough, abrasion-resistant and flexible (even at sub-freezing temperatures). Furthermore, HDPE pipe may be used in small diameter tubing and in pipe up to more than 8 feet in diameter. In general, polyethylene pellets (resins) may be supplied for the pressure piping markets, such as in natural gas distribution, and for the non-pressure piping markets, such as for conduit and corrugated piping.

Rotational molding is a high-temperature, low-pressure process used to form hollow parts through the application of heat to biaxially-rotated molds. Polyethylene pellet resins generally applicable in this process are those resins that flow together in the absence of pressure when melted to form a bubble-free part. Pellets 38, such as certain Marlex® HDPE and MDPE resins, offer such flow characteristics, as well as a wide processing window. Furthermore, these polyethylene resins suitable for rotational molding may exhibit desirable low-temperature impact strength, good load-bearing properties, and good ultraviolet (UV) stability. Accordingly, applications for rotationally-molded Marlex® resins include agricultural tanks, industrial chemical tanks, potable water storage tanks, industrial waste containers, recreational equipment, marine products, plus many more.

Sheet extrusion is a technique for making flat plastic sheets from a variety of pellet 38 resins. The relatively thin gauge sheets are generally thermoformed into packaging applications such as drink cups, deli containers, produce trays, baby wipe containers and margarine tubs. Other markets for sheet extrusion of polyolefin include those that utilize relatively thicker sheets for industrial and recreational applications, such as truck bed liners, pallets, automotive dunnage, playground equipment, and boats. A third use for extruded sheet, for example, is in geomembranes, where flat-sheet polyethylene material is welded into large containment systems for mining applications and municipal waste disposal.

The blown film process is a relatively diverse conversion system used for polyethylene. The American Society for Testing and Materials (ASTM) defines films as less than 0.254 millimeter (10 mils) in thickness. However, the blown film process can produce materials as thick as 0.5 millimeter (20 mils), and higher. Furthermore, blow molding in conjunction with monolayer and/or multilayer coextrusion technologies provide the groundwork for several applications. Advantageous properties of the blow molding products may include clarity, strength, tearability, optical properties, and toughness, to name a few. Applications may include food and retail packaging, industrial packaging, and non-packaging applications, such as agricultural films, hygiene film, and so forth.

The cast film process may differ from the blown film process through the fast quench and virtual unidirectional orientation capabilities. These characteristics allow a cast film line, for example, to operate at higher production rates while producing beneficial optics. Applications in food and retail packaging take advantage of these strengths. Finally, the polyolefin pellets 38 may also be supplied for the extrusion coating and lamination industry.

II. Pressure Control of Multiple Polymerization Reactors

The pellets 38 may be formed using a wide variety of techniques such that the resultant products exhibit characteristics that are considered desirable for some of the aforementioned applications. For example, in some instances, the pellets 38 may be multimodal. That is, the pellets 38 may exhibit a wide range of characteristics resulting from the combination of one or more polymerization processes. To name a few examples, bimodal polymers often have success in various applications of piping as well as food packaging, blow molding and lamination. Indeed, bimodal polymers have many uses wherein the processing of a polymer involves molding, extrusion, and the like.

Methods to produce bimodal pellets may involve a process wherein a first monomer or monomers is polymerized, under a given set of conditions, to produce a first polymer. Typically, the first polymer that is produced is a solid polymer particle that is suspended in a liquid or supercritical diluent, which forms a first slurry. The first slurry may also contain the unreacted first monomer or monomers and the catalyst originally used to polymerize the first monomer, as well as various additives (e.g., co-catalysts, activators, reducing agents). To remove the first slurry produced by the first reactor, some existing techniques provide for the first slurry to be removed using settling legs disposed along the length of the first reactor. For example, in a loop reactor, settling legs may be disposed along one or more of the horizontal lengths of the loop reactor and/or on the bottom elbows of the reactor. Once the settling legs are filled, a valve opens that allows the first slurry to be removed.

Bimodal polymer formation may require a second polymer to be formed in a separate, second polymerization reactor, where a transfer slurry (i.e., the withdrawn first slurry) is introduced along with a second monomer, which may or may not be the same as the first monomer. For example, the first monomer may be ethylene, while the second may be butylene or propylene. In some embodiments, both monomers may be ethylene. Nevertheless, the second monomer is polymerized to form a second polymer, which may be incorporated with the first polymer. The second polymer may be produced in such a way as to incorporate different additives and/or to display a different set of properties than the first polymer. Indeed, the second polymerization reactor may have a different set of catalysts, monomers, additives, co-catalysts, diluents, and reaction conditions than the first polymerization reactor, which allows for the production of polymers with subtle to drastic differences. For instance, in some embodiments, it may be desirable that the first polymer and the second polymer, produced from the same monomer, have differing densities, or such that the first polymer (polyolefin) has a first molecular weight distribution that differs from a second molecular weight distribution of the second polymer. The molecular weight distributions may be considered different in embodiments where the distributions are measured by average molecular weights, or measured by their respective ratios of weight-average molecular weight to number average molecular weight ($M_w/M_n$), and the measurements are different by at least approximately 5%, 10%, 15%, 20% or more.

As with the first slurry, the first and second polymer may be suspended by a liquid or supercritical diluent as part of a second slurry. Existing techniques, as before, may provide for the second slurry to be removed by settling legs disposed along the length of the second reactor (much in the way that the first slurry is removed from the first reactor). Typically, the settling legs are disposed proximate an impeller and/or a tangent of a curvature of the reactor. The settling leg position is usually chosen such that the slurry that is captured by the settling legs has had a sufficient residence time within the reactor to produce a polyolefin with desired properties.

Generally, the features used to introduce the first slurry from the first polymerization reactor into the second polymerization reactor may allow for the two reactors (though there may be more than two reactors) to be connected in series, for example, to increase throughput. In some existing systems, the first slurry may be passed through one of several settling legs and a product take-off (PTO) valve into a bypass line. The PTO valves may fire (open) as a result of exceeding a pressure threshold, thus allowing the slurry to pass through to the line. In some traditional systems, the bypass line starts on the second reactor, loops under the first reactor's settling legs and PTO valves, and returns to the second reactor. In this way, a pressure differential supplied by a pump disposed in the second reactor may supply the motive force to circulate some of the second reactor's slurry through the line. As the slurry from the second reactor circulates through the line, it incorporates the first reactor's slurry whenever a PTO valve fires. Oftentimes, in order to facilitate transfer of the transfer slurry into the second reactor, the first reactor is operated at a higher pressure. Such a pressure differential is typically created using a set point on the PTO valves higher than the second reactor's pressure. The pressure differential may also serve to induce a velocity of slurry through the line, such that the solids of the slurry do not salt out. Thus, the bypass line of existing systems may have a slurry velocity of about 7 meters per second and use approximately 10 percent of the total slurry flow in the second reactor.

Settling legs are often employed in traditional systems due to their ability, as their name implies, to allow gravity settling at various positions within a reactor, which may result in a slurry with an average solids concentration greater than an average solids concentration of the bulk slurry flowing in the reactor. Thus, as is often desirable for multimodal polymer formation using continuous processes, the slurries that are withdrawn from settling legs typically attain an average solids concentration of greater than 37 percent. However, despite the international success of similar continuous processes, with billions of pounds of ethylene-based polymers being so produced, it is now recognized that settling legs currently present difficulties associated with the continuous operation and scale-up of polymerization reactors. For example, the imposition of a "batch" technique such as the use of settling legs onto a continuous process may affect the throughput of a system. Each time a settling leg releases slurry (e.g., a PTO valve fires), the flow of the slurry at both the upstream and downstream portions of the reactor is disturbed, increasing the risk of reactor fouling and/or off-spec product. Further, the settling legs, commonly known in the art to be about 6 to 8 inches in diameter, require frequent maintenance due to the large valves and tight seals necessary for proper system operation. Indeed, the diameter of typical reactors, commonly known in the art to be about 20-about 30 inches, do not afford true continuous takeoff techniques using settling legs or cylinders with similar dimensions, as they may effectively drain the reactor and do not allow sufficient residence time of the circulating slurry.

Current techniques employing settling legs attempt to attain continuous-like behavior of systems by using multiple settling legs, such that the time between each opening of a settling leg (e.g., a firing PTO valve) is minimized. In other words, the more settling legs employed in a process, the more continuous-like the process may become, at least in theory. However, in practice, it is now recognized that due to the relatively large dimensions of each settling leg and the large size of world scale reactors, the number of settling legs required quickly begins to exceed the physical space available on a given reactor. As such, it is now recognized that the utilization of features other than settling legs may be desirable for continuous polymerization processes, in particular those employing a plurality of reactors in series or in parallel, or a combination of both. Such features may utilize one or more continuous take-offs (CTO's) in a number of techniques. It is now recognized that CTO devices provide a number of advantages over settling legs, including lower valve and flange counts in a reactor system, smaller transfer lines between reactors in series, fewer plugged lines, and simpler piping. Further, the CTO devices may also eliminate the need for a bypass line.

A. Reactors in Series Using CTO Devices

Figure 2:
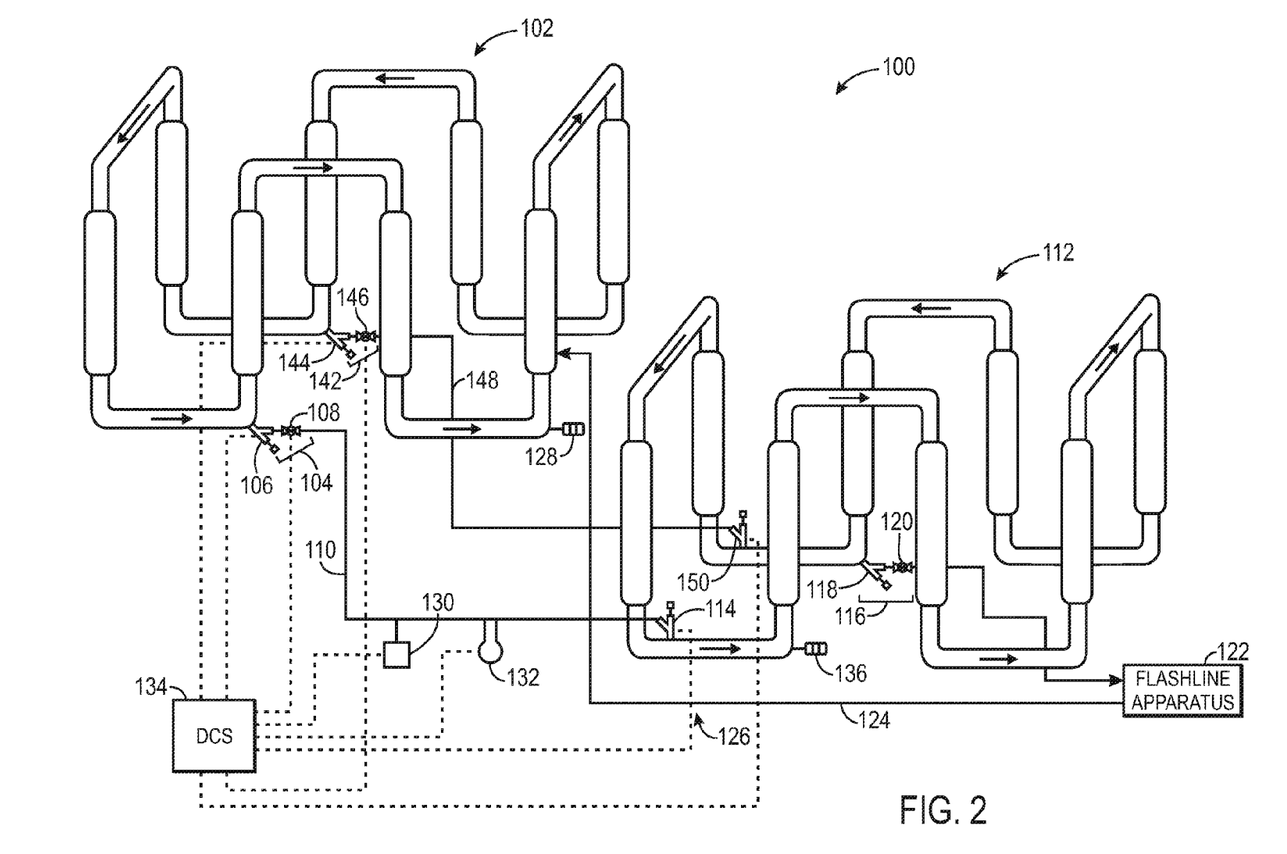
FIG. 2 is a schematic overview of a dual reactor system in accordance with an embodiment of the present techniques.

Referring now to FIG. 2, an embodiment of a series polymerization system 100 employing two polymerization reactors in series using CTO devices is shown. In other embodiments, additional polymerization reactors may be included in series or in parallel. During the operation of system 100, a first reactor 102 produces a slurry that, above certain operating pressures, is continuously withdrawn through a CTO device 104. In some embodiments, the CTO device 104 may contain a number of valves (e.g., 2) that are configured to modulate the removal and flow of slurry from the first reactor 102. The valves may be, as shown in the illustrated embodiment, a "ram"-type valve 106 and a v-ball valve 108. The ram valve 106 of the CTO device 104 may or may not have an extension into the first reactor 102 and may or may not be angled to enhance solids removal, depending upon the placement of the CTO device 104 on the reactor 102 and the desired characteristics of the withdrawn slurry. A CTO device may be referred to as a "solids concentrator" because operation of a CTO device may result in a higher average solids concentration of a withdrawn slurry relative to the average solids concentration of the slurry circulating in the reactor 102. Further, some CTO devices (solids concentrators), as noted above, may have extensions into the slurry circulating within the reactor to enhance solids removal and concentration of solids. Such embodiments of the extension will be described in further detail hereinbelow. In some embodiments, the ram valve 106 may be oriented at an angle between 15 to 60 degrees (e.g., 30 to 45 degrees) from perpendicular to the tangent on the outside radius of an elbow of the first reactor 102 and slanted at the orientation angle in the direction towards the downstream flow of the slurry. The CTO device 104 may direct, using ram valve 106, a portion of the slurry to exit the first reactor 102 as a transfer slurry. The CTO device 104 may then control, using the v-ball valve 108, the flow of the transfer slurry through a conduit (e.g., a transfer line) 110 fluidly coupling the first reactor 102 with a second reactor 112. One end of the transfer line 110 may couple to the second reactor 112 via, for example, a ram valve 114 to enable the slurry to enter the second reactor 112. In some embodiments, the ram valve 114 (or entry point) into the second reactor 112 is on the top side of the loop reactor section or on the inside portion of an elbow of the second reactor 112 such that solids in the area of the inlet to the second reactor 112 is minimized. In such a configuration, this may reduce plugging in low flow, no flow or reverse flow situations. In operation, introduction of the transfer slurry from the first reactor 102 into the second reactor 112 facilitates production of a second slurry within the second reactor 112, which may be continuously withdrawn via a CTO device 116 (also containing a ram valve 118 and in some embodiments a v-ball valve 120) leading to a flash line apparatus 122. During operation, the flash line apparatus 122 may separate a liquid medium of the second slurry from a polymer product of the second slurry. The liquid medium may then be recycled and directed back, via recycle line 124, to the first reactor 102 or, in some embodiments, to the second reactor 112 for use in the continuous polymerization process. Additionally, monomer/comonomer, make-up diluent, and catalyst feed lines 126 may feed into the recycle line 124 leading from the flash line apparatus 122 to the first reactor 102.

To increase the efficiency of the continuous polymerization process, in some embodiments, the CTO device 104 may be precisely located and oriented to increase the solids concentration of the slurry removed from the first reactor 102 and may be referred to as a solids concentrator, as noted above. In certain of these embodiments, as shown in FIG. 2, the CTO device 104 may have the ram valve 106 positioned on a curvature of the first reactor 102. In some embodiments, the ram valve 106 (and thus the CTO device 104) may be disposed on the first reactor 102 at a downstream segment of the first reactor. In these instances, it may be desirable that the CTO device 104 be positioned ahead of a motive device 128 which, during operation, serves to circulate and mix the bulk slurry within the first reactor 102. Positioning the ram valve 106 in this way may allow the CTO device 104 to collect slurry from a stratum of the circulating bulk slurry that has a relatively higher solids concentration, substantially without the use of gravity settling. For example, in some embodiments, at certain circulation velocities, the slurry may display strata having solids concentrations different from the average solids concentration present within the overall first reactor 102 and/or second reactor 112. In certain of these instances, the strata are a result of the combination of gravity and decreased slurry velocity. That is, at a lower slurry circulation velocity, heavier portions of the slurry (e.g., solids) may be carried along a portion of the slurry proximate a lower surface of the first reactor 102 (and/or the second reactor 112), while lighter portions (i.e., diluent and small particulates) are carried along a portion of the slurry distal from the lower surface of the first reactor 102 (and/or the second reactor 112). However, while the stratification may be at least partially a result of gravity, it should be noted that the solids are not allowed to settle, as with conventional systems incorporating PTO's. Accordingly, the CTO device 104, precisely disposed and oriented and with the ram valve 106 having an extension into the first reactor 102, may be particularly advantageous in certain embodiments of the operation of system 100 by limiting the amount of materials (e.g., diluent, unreacted monomer and co-monomer) other than the polyolefin product (i.e., solids) present within the withdrawn (transferred) slurry.

In embodiments where the ram valve 106 has an extension into the first reactor 102, the extension may protrude into the flowing slurry proximate a bottom surface of the first reactor 102. In such embodiments, the extension may be a protrusion from the ram valve 106, such that as solids within the slurry flow through the reactor 102, they may contact the protrusion and be collected on the surface of the protrusion facing the direction of the flow of the slurry. Accordingly, the collected solids may be withdrawn through the ram valve 106, with the slurry having a higher solids concentration than the average solids concentration of the slurry flowing through the reactor 102. Therefore, to the extent that CTO devices having such extensions increase solids concentrations in withdrawn slurries, a CTO device having a protrusion into the slurry circulating within the reactor may also be referred to as a solids concentrator. In some embodiments, the protrusion may be a curved protrusion, such as a scoop, that allows the efficient collection of solids.

To the extent that the extension and the ram valve 106 allow the withdrawn slurry to have a higher solids concentration than the average solids concentration of the slurry circulating within the first reactor 102, the extension (protrusion) and the ram valve 106 may be considered a solids concentrator. Additionally, it should be noted that the second reactor 112 may also include one or more solids concentrators. For example, the ram valve 118 may have an extension or protrusion into the slurry circulating within the second reactor 112. Therefore, it should be noted that while the extension of the ram valve 106 into the first reactor 102 is presently discussed in the context of the withdrawal of slurry from the first reactor 102, the embodiments described herein are substantially equally applicable to the withdrawal of slurry from the second reactor 112. As such, the slurry withdrawn from the second reactor 112 may have a higher solids concentration than the average solids concentration circulating within the second reactor 112 due to the presence of one or more solids concentrators.

In another embodiment, the ram valve 106 may have an extension in the form of a tube extending into the slurry flowing through the reactor 102. In this embodiment, the tube may be curved towards the flow of the slurry circulating through the reactor with an opening for receiving a portion of the slurry. In one embodiment according to this aspect, the extension may be disposed proximate an outer surface (e.g., a bottom surface) of the reactor 102 and thereby collect solids from a stratum containing higher solids content than the average solids content of the overall slurry circulating through the reactor 102. In certain of these embodiments, the opening may be oval or scoop-shaped.

Accordingly, in some configurations utilizing an aspect of the current technique, one polymerization reactor may produce a polymer having a high molecular weight and a low density and the other polymerization reactor may produce a polymer having a lower molecular weight and a higher density. It should be noted that the current technique provides for either the first reactor 102 or the second reactor 112 to perform either of the above tasks. However, for simplicity, one particular embodiment is described herein. For example, in one embodiment the first reactor 102 may produce high molecular weight polyethylene by using relatively high amounts of liquid-based reagents (e.g., 1-hexene) and low amounts of hydrogen chain transfer agent. In certain of these embodiments, the first slurry in the first reactor 102 may have relatively low levels of ethylene monomer (e.g., about 0.5 to about 5.0 wt %, or about 0.5 wt %, or about 1.0 wt %, or about 1.5 wt %, or about 3.0 wt %) and relatively high concentrations of 1-hexene (e.g., about 3 wt % to about 12 wt %, or about 4 wt %), which may produce a high molecular weight polymer with a low polymer density. However, it may be equally as desirable to produce a lower molecular weight polymer with a high density in the second reactor 112 and substantially limit the amount of 1-hexene present while having high amounts of hydrogen within the second reactor 112. For example, the monomer content within the second reactor 112 may be between about 3 wt % and about 12 wt % (e.g., about 4, 4.5, 5, 6, 7, 8, 9, or 10 wt %). Indeed, the CTO device 104 may serve to substantially limit the amount of 1-hexene transferred to the second reactor 112 by withdrawing a slurry with a high solids content (i.e. a low 1-hexene content), thus facilitating the production of a lower molecular weight high density polymer in the second reactor 112. Of course, by facilitating the production of polymers with desirable characteristics, the overall multimodal process may benefit from the use of CTO devices.

B. CTO-Transfer Line Design

Additionally, the use of ram valve 106 as an exit valve from the first reactor 102 may provide the advantage of a lower risk of reactor fouling. This may be due to a mode of operation of the ram valve 106, where the entrance to the transfer line 110 may remain open and not plug due to the "plunging" mechanism of the valve 106 when it periodically closes. The ram valve 106, in one embodiment, affords the advantage over other types of valves in that other valves, such as ball valves, allow a part of the line 110 to remain open to the polymerization reactor 102, and would require continual diluent flushing to prevent reactor fouling. In a further embodiment, the ram valve 106 may be automated. During the course of operation, if a leak or other negative operating factor is detected by a sensor (such as a pressure sensor 130 and/or a flow sensor 132), the ram valve 106 may be closed by a controller in communication with the sensor, such as a distributed control system (DCS) 134, which in turn may substantially isolate the first reactor 102 from the transfer line 110 and the second reactor 112. Automation of ram valves within the system 100 may also afford other desirable operating conditions, such as parallel operation by closing both ends of the transfer line 110, in turn isolating the first reactor 102, transfer line 110 and the second reactor 112 from one another. Further embodiments and techniques regarding parallel operations are described below.

As discussed above, the transfer line 110 may facilitate transfer of the slurry produced in the first reactor 102 to the second reactor 112 through the ram valve 106. To prevent salting out of the solid of the transfer slurry within the transfer line 110, a minimum velocity may be maintained such that the velocity is sufficient to suspend the particles within the diluent. Accordingly, to prevent potentially plugging the transfer line 110 and fouling the reactor system 100, the design of a CTO multimodal polymerization system, as represented by the system 100, may allow for a high velocity of transfer slurry flow through the transfer line 110. In the design of such systems, it may be useful to predetermine the velocity suitable to prevent salting out within the transfer line 110. Accordingly, in some aspects, the velocity suitable to prevent salting out within the transfer line 110 may be modeled, taking into account solids concentration, particle size, and conduit dimensions, among other parameters, using equations known in the art (e.g., the Durand equation, the Darcy equation, and modifications thereof).

Indeed, to achieve a desired velocity through the transfer line 110, various design considerations may include the length and diameter of the transfer line 110 as well as the dimensions (e.g., length and diameter) of each reactor. According to present embodiments, by using CTO devices to facilitate the flow of slurry through the transfer line 110, longer distances in between each reactor may be possible compared to other techniques, such as those utilizing pressure take off valves and/or settling legs. Indeed, the higher flow rates and greater pressure drop afforded by CTO devices may allow sufficient transfer slurry velocities even at transfer line lengths exceeding approximately 100 feet, 200 feet, 300 feet, 400 feet or more. It should be noted, however, that the appropriate dimensions of the transfer line 110 may depend on the size of each reactor and the horizontal distance between the reactors.

In some embodiments, the overall distance that the transfer slurry travels in between the first reactor 102 and the second reactor 112 may be a design consideration when determining a suitable velocity of the transfer slurry and its relation to the length of the transfer line 110. Further, the length of the transfer line 110 may not necessarily be equal to the horizontal length separating the first reactor 102 and the second reactor 112. To span a horizontal length of, for example, 100 feet, the transfer line 110 may have approximately 220 feet, 440 feet or more of line length, which accounts for elbows, bends, loops, curvatures, and so forth of the transfer line 110. In other words, fluid flowing through the transfer line 110 would travel a distance of approximately 220 feet, 440 feet or more through piping in order to pass between the reactors 102, 112, which may be spaced 100 feet apart.

The actual line length (e.g., the 240 feet, 440 feet or more) may be referred to as the "equivalent line length" of the horizontal distance between the reactors (e.g., 100 feet). Likewise, the first reactor 102 and second reactor 112 also have equivalent line lengths. That is, fluid flowing through the reactors 102, 112 may travel a greater distance than the mere distance between the inlet and outlet of each reactor. For example, the first reactor 102 and second reactor 112 may have equivalent line lengths of at least approximately 200 feet. Specifically, as an example, the equivalent line length of each reactor 102, 112 may be approximately 880 feet or more. Therefore, it may be possible to represent the ratio of equivalent line length of the transfer line 110 to the equivalent line lengths of the first reactor 102 and/or second reactor 112 in determining, for example, appropriate transfer slurry velocity. In configurations where the equivalent length of the first reactor 102 and/or second reactor 112 are approximately 880 feet with 100 feet of horizontal distance therebetween, the equivalent length of the transfer line 110 would be approximately 220 feet at a ratio of approximately 25% or approximately 440 feet at a ratio of approximately 50%. Indeed, such ratios may be appropriate when using CTO devices to facilitate slurry transfer, while other configurations, such as those utilizing PTO valves, may be unable to provide a sufficient slurry velocity at such ratios, which may result in solids saltation or other undesirable flow characteristics.

In addition to length, the diameter of the transfer line 110 is a design consideration for suitable transfer slurry velocities. While a wide array of diameters may be suitable for the transfer line 110, in a general sense, the diameter of the transfer line 110 may be lower than the diameter of a settling leg (i.e., less than 8 inches). The transfer line 110 may be designed to display a diameter in the range of about 1 to about 4 inches, which may result in design velocities ranging from about 4 ft/sec to about 30 ft/sec, depending upon implementation-specific needs. For example, the transfer line may be designed in to have a diameter of exactly or about 1, 2, 3, or 4 inches, or any diameter therebetween. Indeed, in some embodiments, the transfer line 110 may be equal to or less than about 3 inches such that larger size valves (above about six inches), which require more maintenance, may be avoided. Further, it may be appreciated that by using a line with a relatively small diameter, operational hazards, such as line breaks, may pose less danger than existing techniques employing lines with greater diameters.

It may be calculated that the transfer line 110 should be designed to a minimum velocity, for a solids concentration of about 50%, of between about 4 ft/sec for a low-density, high molecular weight polyethylene resin. Thus, in embodiments where a CTO device is employed (such as the CTO device 104), which may consistently attain solids concentrations in this range, the transfer line 110 may be designed for approximately 20 to 30 ft/sec (e.g., about 28 ft/sec) velocity. In other embodiments, for example, at a lower solids concentration within a 2-inch transfer line (an example of a diameter of a transfer line in accordance with the present embodiments), 19000 lb/hr of isobutane diluent, or a velocity of 8.7 ft/sec as calculated, may be the velocity required to prevent the solids of the slurry from salting out under reactor conditions. Accordingly, the transfer line may have a design velocity ranging between 4 ft/sec and 30 ft/sec (e.g., between 5 ft/sec and 28 ft/sec, about 8 ft/sec and 25 ft/sec, 10 ft/sec and 20 ft/sec, 13 ft/sec and 18 ft/sec). As may be appreciated, a design directed to allowing for a given velocity of slurry flow through the transfer line 110 may include features to modulate the flow of slurry from the first reactor 102 to the second reactor 112. Such features may include the v-ball valve 108 of the CTO device 104.

C. Pressure Control Using CTO Devices

In some aspects of the operation of the continuous system 100, the pressure differential between the reactors may be crucial to the performance the continuous system 100 and the resultant properties of the polyolefin product. Therefore, it may be desirable to include features within the transfer line 110 connecting the reactors in series to control the pressure of the first reactor 102. This may be, in certain embodiments, at least partially performed by the v-ball valve 108 of the CTO device 104 within the transfer line 110. For example, by controlling the flow rate of the first slurry through the transfer line 110, the v-ball valve 108 may essentially control the pressure of the first reactor 102. In some aspects, by opening the v-ball valve 108, the pressure within the first reactor 102 may decrease by allowing a greater flow of slurry to exit the first reactor 102. In such an embodiment, the reverse operation may serve to increase the pressure within the first reactor 102. The pressure sensor 130 and flow sensor 132 disposed along the length of the transfer line 110 may respectively monitor the pressure and flow rate of the slurry passing through the transfer line 110. The sensors 130 and 132 may relay the flow and pressure information to the DCS 134, which may automatically adjust the v-ball valve 108 so that the pressure and flow are within a desired operating range.

In addition to at least partially controlling the flow of slurry through transfer line 110, adjustment of the v-ball valve 108 may also at least partially control the flow rate of slurry entering the second reactor 112. In some embodiments, this may at least partially control other aspects, such as the pressure of the second reactor 112. That is, the v-ball valve 108, when correctly modulated, may at least partially increase or decrease the flow of slurry entering into the second reactor 112, and, thus, at least partially control pressure in the second reactor 112. Accordingly, the v-ball valve 108 may at least partially regulate the flow of slurry into, and thus the pressure of, the second reactor 112. In some embodiments, the adjustment by the v-ball valve 108 may be able to control the slurry velocity within a small range, for example, to within 0.5 ft/sec. Conversely, in certain of these embodiments, the ram valve 106 on the first reactor 102 may altogether start or stop the flow of slurry exiting the first reactor 102. It may be appreciated that, in instances where the pressure of the second reactor 112 is controlled by the v-ball valve 108, that the ram valve 114 leading into the second reactor 112 may be continuously open.

Figure 3:
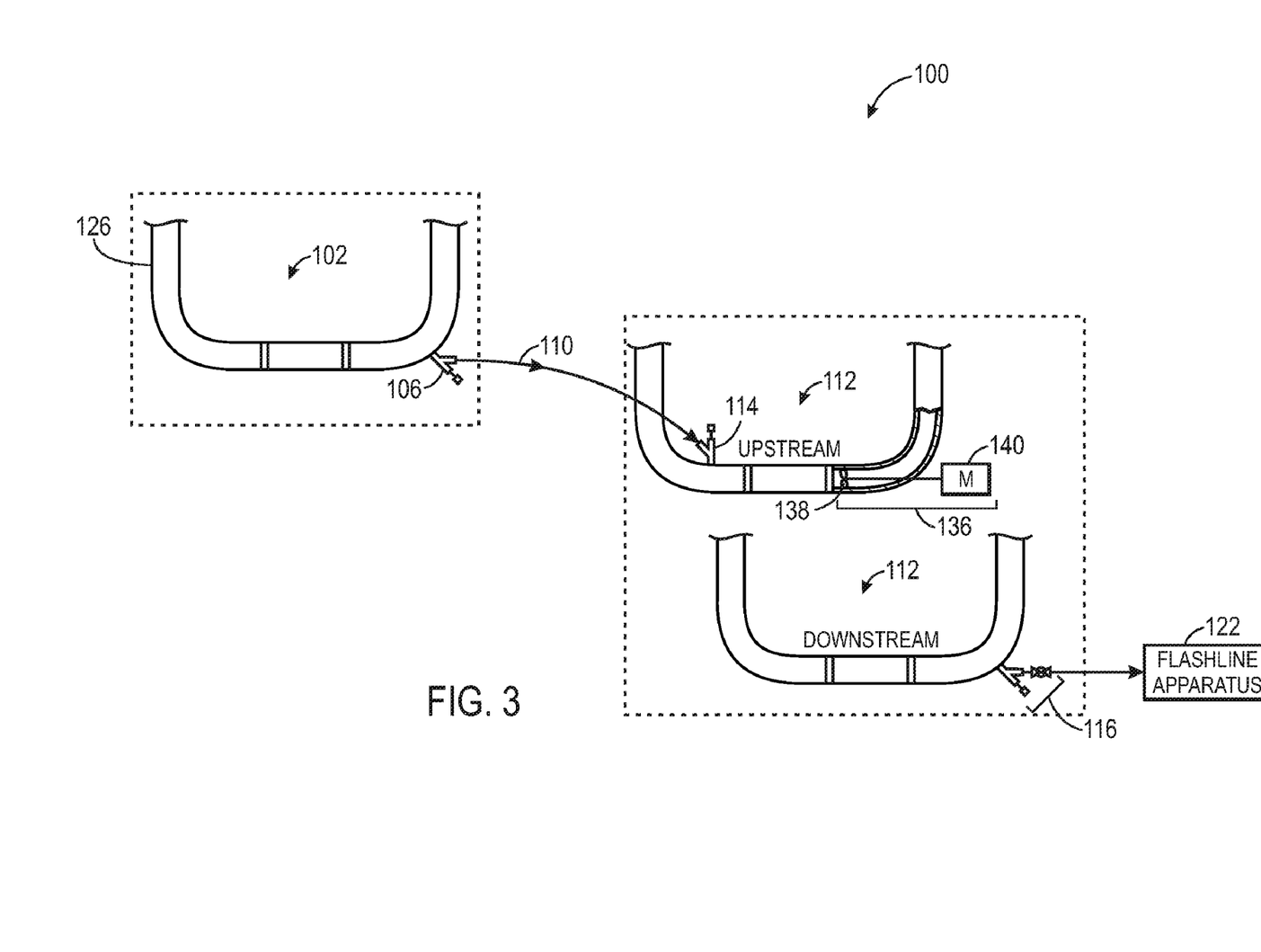
FIG. 3 is an illustration of a continuous take off device of a dual reactor system in accordance with an embodiment of the present techniques.

Referring now to FIG. 3, an embodiment is shown where the v-ball valve 108 is excluded, which may allow a continuous flow between the first reactor 102 and the second reactor 112 through transfer line 110. In such embodiments, pressure within the first reactor 102 may be at least partially controlled by fluidly connecting the first reactor 102 and the second reactor 112 in a continuous state. For example, during the course of operation when the ram valve 106 on the first reactor 102 and the ram valve 114 on the second reactor 112 are fully open, the first reactor 102 may float on the pressure of the second reactor 112. That is, a higher pressure level in the first reactor 102 than in the second reactor 112 will cause the slurry produced in the first reactor 102 to flow through the transfer line 110 to the second reactor 112. In such embodiments, controlling the pressure of the second reactor 112 with outlet valves (e.g., using the CTO device 116) may maintain the pressure of the second reactor 112 at a substantially fixed level. By extension, the pressure of the first reactor 102 may be at least partially controlled by the flow of slurry exiting the second reactor 112. Indeed, it should be noted that in some embodiments, the pressure of the first reactor 102 and the second reactor 112 (and thus the flow rate of transfer slurry through the transfer line 110) may be controlled using only the continuous take-off device 116 that is disposed on the second reactor 112 along with the influx of polymerization components into the first reactor 102 (e.g., monomer, comonomer, diluent, and so forth). Accordingly, in a similar manner to the ram valve 106 being continuously opened, the continuous take-off device 104 disposed on the first reactor 102 may be excluded altogether.

In some embodiments, it may be desirable to calculate the slurry velocity necessary to prevent salting out within the first reactor 102 and the second reactor 112. Skilled artisans will recognize that some important parameters to consider may include the slurry viscosity (which may be calculated, for example, using a Gay-Nelson-Armstrong equation), the Reynolds number of the slurry, the surface roughness of the solids within the slurry, and the diameter of the pipe of the loop reactor. Additionally, the friction factor of the slurry may be calculated using a Colebrook equation. The circulation rate of the slurry may be further adjusted to account for a pressure drop, such as a pressure drop calculated including the Darcy and/or Durand equations. The rate may be matched to a specification of a motive device, such as a motive device 136 (e.g., a pump curve). In certain embodiments, it will also be important to maintain flow in continuous take off appendages from the reactors 102, 112. This can be accomplished by maintaining a minimum velocity in the transfer line 110 to prevent plugging and/or saltation of the solids. This velocity might be calculated using methods known in the art, as mentioned above.

In the illustrated embodiment in FIG. 3, the ram valve 114 is disposed at an upstream segment of the second reactor 112 proximate and before the motive device 136, which includes an impeller 138 and a motor 140. Such a configuration may allow the pressure within the first reactor 102 to be reduced. For example, such a location may reduce the overall pressure in the first reactor 102 as line 110 discharges into the lowest pressure point in the second reactor 112. This location may also provide for dispersion of the concentrated transfer slurry coming from line 110 by the turbulence and mixing action of the pump impeller 138. Additionally, the ram valve 114 may be located on the top side or inside radius of an elbow of the second reactor 112 to reduce plugging tendencies during low, no flow, or reverse flow situations. In operation, the embodiment as illustrated would thus allow continuous flow of slurry from the first reactor 102, through the transfer line 110, and to the second reactor 112. In such an embodiment, the CTO device 116 disposed on a downstream segment of the second reactor 112 would be the primary feature responsible for allowing slurry to exit the overall system 100. Conversely, the feed 126 into the first reactor 102 would be the primary feature responsible for allowing materials to enter the system 100. As may be appreciated, the juxtaposition of these two features may allow for the control of the pressures of the first reactor 102 and the second reactor 112. Of course, there will be a pressure gradient present between the two reactors, such that the pressure within the first reactor 102 is higher than the pressure within the second reactor 112, effectively supplying the motive force for the transfer slurry to flow from the first reactor 102 to the second reactor 112.

Thus, as feed 126 comes into the first reactor 102, pressure may increase within the first reactor 102 until its pressure is sufficient to flow an equal volume of slurry to the second reactor 112 (if the reactors are substantially the same size or similar in size). Indeed, if the feed rate increases, the first reactor 102 pressure may increase, if the feed rate decreases, the first reactor 102 pressure may decrease. In such embodiments, the flow rates through the transfer line 110 are thus substantially controlled by the pressure differential between the reactors (e.g., the first reactor 102 and the second reactor 112) in series. Additionally, as noted above, the size ratio of one reactor to the other may at least partially affect the pressure differential, the amount of transfer slurry flowing through the transfer line 110, and/or the amount of slurry withdrawn from each or both reactors 102, 112. In some embodiments, the reactors may be substantially the same size (i.e., substantially equal volumes) or similar in size (i.e., similar volumes) to address issues with large pressure differentials, slurry volume differentials, and so forth. In accordance with present embodiments, the reactors 102, 112 may be referred to as being similar in size if their volumes differ by no more than approximately 20% or by no more than approximately 10%.

D. Multiple Transfer Lines

The system 100 may also have features in place such that a plugged transfer line will not substantially affect the throughput of the reactors in series. As embodied in FIG. 2, it may be desirable to have more than one transfer line (e.g., between 2 and 5 transfer lines, inclusive) disposed on each reactor. Such features may include an additional CTO device 142 including a ram valve 144 and a v-ball valve 146 configured to withdraw slurry from the first reactor 102 and transfer the slurry, via an additional transfer line 148, to the second reactor 112. As with the primary transfer line 110, the additional transfer line 148 may couple to the second reactor using a ram valve 150. For example, in situations where a transfer line becomes plugged, such as the transfer line 110, the pressure sensor 130 disposed along the length of the transfer line 110 may relay certain data indicative of a plug to the controller 134. The controller 134 may signal a valve, such as the v-ball valve 108 and/or the ram valve 106 (the combination being the CTO device 104) to close, and nearly simultaneously open the ram valve 144 and/or the v-ball valve 146 (the combination being the additional CTO device 142) that lead to the transfer line 148. The CTO devices 104 and 142 may be disposed along different take-off positions on the reactor 102 such that certain characteristics of the withdrawn slurry (e.g., slurry velocity, stratified solids content) are substantially the same. In some embodiments, the ram valves 106 and 144 of the CTO devices 104 and 142, respectively, may be disposed on the first reactor 102 at points on the reactor elbows such that the slurry experiences stratification as a result of a localized increased slurry velocity. Indeed, in some embodiments, the ram valves 106 and 144 of the CTO devices 104 and 142 may be configured to withdraw slurry from about the same area on the first reactor 102. Similarly, transfer lines 110 and 148 may be configured to deliver the transfer slurry to the second reactor 112 at about the same position. In other embodiments, transfer lines 110 and 148 may be configured to deliver slurry from the first reactor 102 to the second reactor 112 at different positions. In certain aspects, it may be desirable for each transfer line to deliver slurry from the first reactor 102 to the second reactor 112 such that the slurry from the first reactor 102 entering into the second reactor 112 experiences a strong motive force upon entering the second reactor 112. As such, the point at which the transfer lines 110 and 148 fluidly couple with the second reactor 106 may be disposed proximate the motive device 136 and proximate an inside radius of a curvature of the second reactor 112. Of course, transfer lines 110 and 148 may share or have similar valving and control systems such that the controller 134 may substantially automate the entire process of switching between transfer lines and controlling the flow through each line. It may be appreciated that in some embodiments, the transfer lines 110 and 148 may operate simultaneously or approximately simultaneously. That is, in some embodiments, valves within the transfer line 110 and the transfer line 148 may be open such that the slurry produced by the first reactor 102 is continuously withdrawn and flows through transfer lines 110 and 148 and into the second reactor 112. In some embodiments, for example during a startup procedure of the reactor system 100, controller 134 will act to maintain the minimum velocity in the transfer lines 110 and 148 by initially opening one of the lines, rather than both, to avoid low line velocities and saltation of solids during times of low feed rates. In embodiments where production rate and reactor feed increase sufficiently, the controller 134 will open the second transfer line (the one that is not opened in the startup procedure mentioned above) to avoid exceeding a pressure threshold of the first reactor 102.

E. Line Servicing

Figure 4:
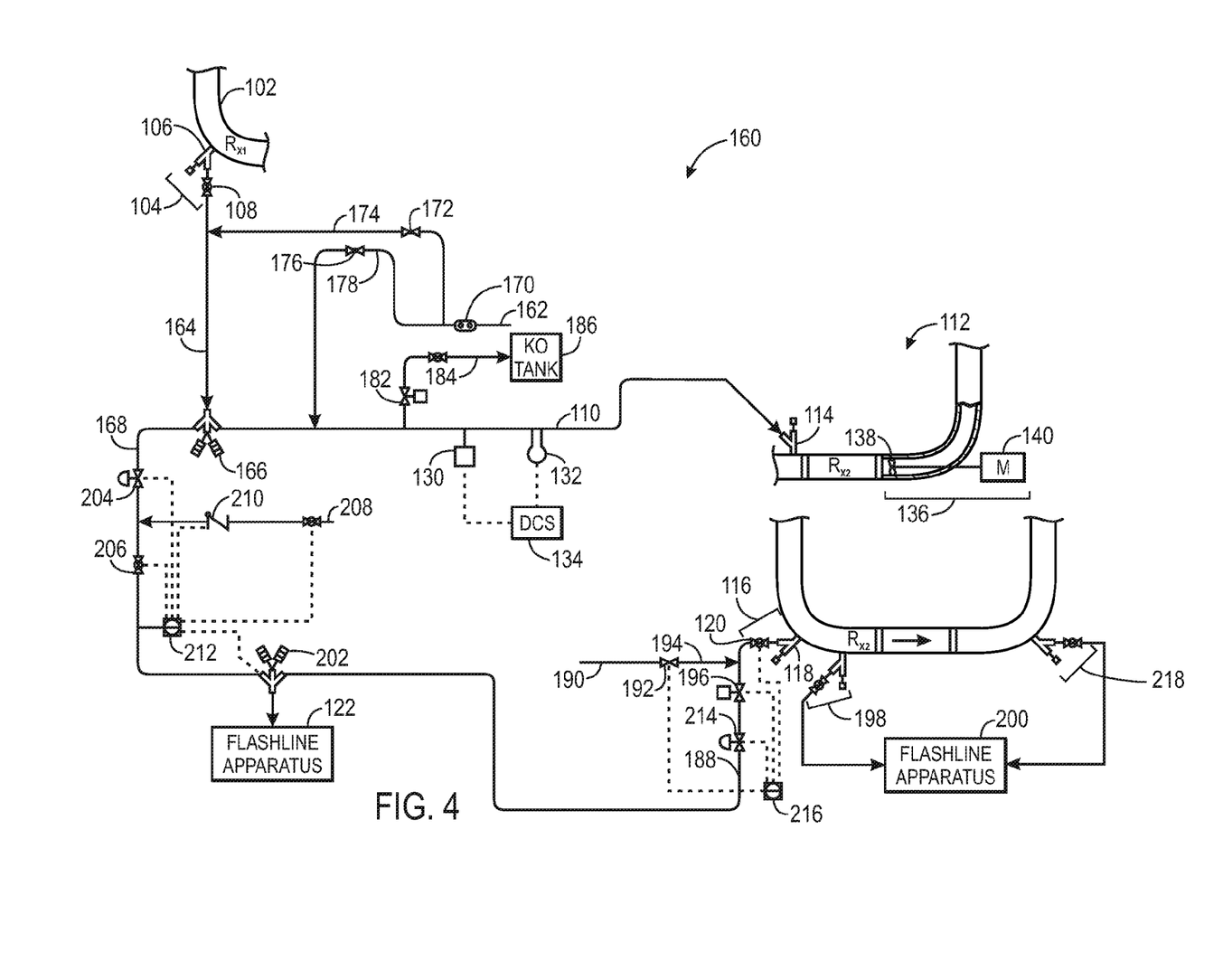
FIG. 4 is an illustration of piping features of a dual reactor system in accordance with an embodiment of the present techniques.

Referring now to FIG. 4, an illustration of a piping diagram of system 160, which is a modification of system 100, is shown. System 160 includes features for independently servicing transfer lines and/or operating the first reactor 102 and the second reactor 112 independently of one another. It may be appreciated that the modified system 160 may include many of the features described with respect to system 100. As many of the embodied features of system 100 accord with the present technique, those features are presently identified using the same reference numerals. In the event that one or more transfer lines between reactors in series experience a plug, the polymerization system 160 provides features that not only facilitate switching between transfer lines, but also facilitate servicing each line independently. As illustrated, the features for independently servicing a transfer line, such as transfer line 110, may include a diluent supply line 162 that is able to flush the transfer line 110, as well as a primary line 164. It should be noted that in the illustrated embodiment, the primary line 164 may lead to the transfer line 110 or a line 168 that leads to the flashline apparatus 122. In these embodiments, a diverter valve 166 may be configured to divert the slurry withdrawn from the first reactor 102 to the second reactor 112 or the flashline apparatus 122. The diluent supply line 162 may include features that enable the diluent (e.g., isobutane, propane, supercritical propane) to flow at a rate that is sufficient to flush remaining polymer particles out of the lines 110 and 164. Such features may include a diluent supply pump 170 that supplies multiple diluent flushes. One such flush is controlled by control valve 172 that controls diluent flow through a flush line 174 leading to the primary line 164. The diluent flush line 162 may also have a control valve 176 for controlling diluent flow through a flush line 178 that leads to the transfer line 110. Control valves 172 and 176 may be configured to close off their respective flush lines. The features for independently servicing the transfer lines may also include a drain valve 182 disposed along the length of the transfer line 110, the drain valve 182 leading to a drain line 184 that delivers the flushed components (e.g. clogged polymer, diluent) to a tank that can handle solids, for example, a knockout tank 186. Of course, the transfer line 110 should, as shown with respect to FIG. 2, have pressure and flow monitors 128 and 132, such that the process may be configured to be operated manually or automated by the DCS 134.

During operation, if the transfer line 110 should become plugged, the ram valve 114 may be closed and the diverter valve 166 may close the opening to the transfer line 110 such that the transfer line 110 is isolated from both reactors. In certain of these instances, the slurry may be drained from the transfer line 110 by opening drain valve 182 and allowing the contents within the transfer line 110 to flow through drain line 184 and to the knockout tank 186. The diluent flush line 162 may allow diluent, such as isobutane, to be controlled by valve 176 through flush line 178 and to the transfer line 110 so that the diluent flushes the transfer line 110 free of remaining polymer particles and the like. The drain valve 182 and the drain line 184 may also facilitate draining the contents of the first reactor 102 to the knock out tank 186. It should be noted that the operation of draining slurry and so forth to the knock out tank 186 may include flushing the reactor 102 and primary line 164 contents using a diluent (e.g., isobutane) from the diluent supply line 162 to force out any remaining polymer particles. Specifically, the diluent supply line 162 may receive diluent from a diluent source (e.g., a diluent tank), and the pump 170 may supply the motive force to flush the diluent through flush line 174 and thus, the primary line 164. The diverter valve 166, in this embodiment, should divert the flushed contents through the transfer line 110, through drain valve 182 and drain line 184, to the knockout tank 186. Of course, the diluent supply lines 174 and 178 may serve as flush points to various lines exiting the first reactor 102. It should be appreciated that the total number of lines exiting the first reactor 102 may be equaled or exceeded by the total number of flush lines. As mentioned, sensors 130 and 132 may communicate pressure and flow information, respectively, to the DCS feature 134, allowing an operator to ascertain various aspects of the transfer line 110, such as the integrity of the line and future operability.

It should be noted that the second reactor 112 may have similar features with regard to flushing a line 188 that exits the second reactor 112 (and thus flushes the contents of the second reactor 112). That is, the CTO device 116 may continuously withdraw slurry into the line 188, which may be serviced using features including a diluent supply line 190. The diluent supply line 190 may include similar features to the diluent supply line 162 described with respect to the first reactor 102 and the transfer line 110 including a control valve 192, and a flush line 194. Again, the number of lines exiting the second reactor 112 may be equaled or exceeded by the number of flush lines from the diluent supply line 190. A shutoff valve 196 may be configured to force the diluent from the diluent supply line 190 to go through the second reactor 112 (thereby flushing the second reactor 112) and out through a different CTO device, such as a CTO device 198. In some embodiments, the CTO device 198 may lead to a second flashline apparatus 200 for product and diluent recovery.

F. Series and Parallel Operation

Further illustrated in FIG. 4 are features that may allow the system 160 to be reliably switched back to single reactor operation (both reactors operating independently). Indeed, the system 160 may be configured such that at an operator's discretion and/or in the event of a transfer line plug, the first reactor 102 and the second reactor 112 may be operated in parallel (i.e., not in series). In such embodiments, the slurry withdrawn by the CTO device 104 into the primary line 164 exiting the first reactor 102 may be diverted to line 168, and thus the flashline apparatus 122, by diverter valve 166. As mentioned with respect to system 100 (FIG. 2), the second reactor 112 may have a CTO device 116 that enables the second slurry to be continuously withdrawn to the line 188 that leads to the flashline apparatus 122. To keep line 168 carrying the slurry produced in the first reactor 102 separate from the line 188 carrying the slurry produced in the second reactor 112, the system 160 may have a diverter valve 202 that is configured to selectively allow either line to enter the flashline apparatus 122.

During parallel operation, in some embodiments, the pressure of the first reactor 102 may be substantially controlled via the CTO device 104 within the primary line 164 and/or with other valves disposed within the line 168 leading to the flashline 122 by controlling the flow of slurry exiting the first reactor 102. In some embodiments, the feed into the first reactor 102 may also play a role in controlling the pressure of the first reactor 102. In certain of these embodiments, the polymer product from the first reactor 102 may be continuously collected and the diluent of the slurry continuously recycled back to the first reactor 102. The line 168 leading to the flash line apparatus 122 may have features that are able to control the flow of slurry to the flash line apparatus 122, including, for example, a diaphragm valve 204 and/or a v-ball valve 206. Other possible features may include a diluent flush line 208 with a one-way valve 210, which may be utilized to flush the line 168 with diluent should the line 168 become clogged and/or if maintenance is required. It should be appreciated that the diaphragm valve 204 and the ball valve 206 may be disposed on either side of the area where the diluent flush line 208 meets the line 168, allowing either side of the line 168 to be selectively flushed. The line 168 from the first reactor 102 may also have a shared control/shared display unit 212, such that the process of transferal of the slurry and flushing of the line 168 may be at least partially controlled at one location.

In addition to the lines from the first reactor 102, the CTO device 116 disposed on the downstream portion of the second reactor 112 may lead to the flash line apparatus 122. Indeed, the line 188 leading away from the second reactor 112 via the CTO 116 may include features similar to those leading away from the first reactor 102. For example, the slurry exiting the second reactor 112 may flow through line 188. The flow rate of the slurry exiting the second reactor 112 may be at least partially controlled by the ram valve 118, the v-ball valve 120, or both, of CTO device 116. A diaphragm valve 214, may also at least partially control the flow of slurry through the line 188. The slurry may be directed to the diverter valve 202, which may direct the flow of the second slurry to the flash line apparatus 122. As with line 168, a shared controller/display 216 may allow an operator to at least partially control the continuous slurry removal, line servicing and flushing processes associated with the second reactor 106 at one location.

In some aspects, the controllers 134, 202 and 216 may be in communication with one another. In such aspects, the controllers may reliably switch the system 160 between parallel and series operation. For example, if parallel operation is desired, controller 134 may operate the diverter valves 166 and 202 to direct the slurry exiting the first reactor 102 to the line 168 leading to the flash line apparatus 122. In a nearly simultaneous fashion, the ram valve 114 may be closed, isolating the transfer line 110. The diluent supply line 162 may begin to flush the transfer line 110 according to the process described above, eventually draining the contents of the transfer line 110 into the knockout tank 186. The controller 212 may, in response, begin to control the flow of slurry through the line 168 using valves 204 and 206, thereby changing the operating pressures, slurry flow rates, and similar factors within line 168 to suit any number of new parameters that may result from the change to parallel operation. Similarly, controller 216 may then perform operations including directing the diaphragm valve 214 to control the flow of the second slurry through line 188. The diverter valve 202 may be controlled by either or both of the controllers 212 and 216, such that the first and second slurries from lines 168 and 188, respectively, do not mix. In some embodiments, for example during parallel operation, the flow of slurry from the second reactor 112 may flow from the CTO device 198, line 188 or a secondary CTO device 218, to the second flashline apparatus 200 to recover polymer from reactor 112 separate from the polymer from the first reactor 102 and the flashline apparatus 122. Conversely, if during parallel operation series operation is desired, the controller 134 may switch the diverter valve 166 to direct the flow of the first slurry from the first reactor 102 to primary line 164, and then to transfer line 110, while substantially simultaneously closing drain valve 182. It should be noted that the transfer line 110 may be filled with diluent before slurry is directed to the transfer line 110, such that the second reactor does not experience a pressure drop when ram valve 114 is opened by controller 134. The controller 212 may then direct the diluent flush line 208 to flush line 168, and the controller 216 may change the operating conditions of the diaphragm valve 214. As before, the controller 212 or the controller 216 may direct the diverter valve 202 to allow the slurry flowing from line 188 to flow to the flashline apparatus 122.

G. Flashline and Diluent Recycle

Figure 5:
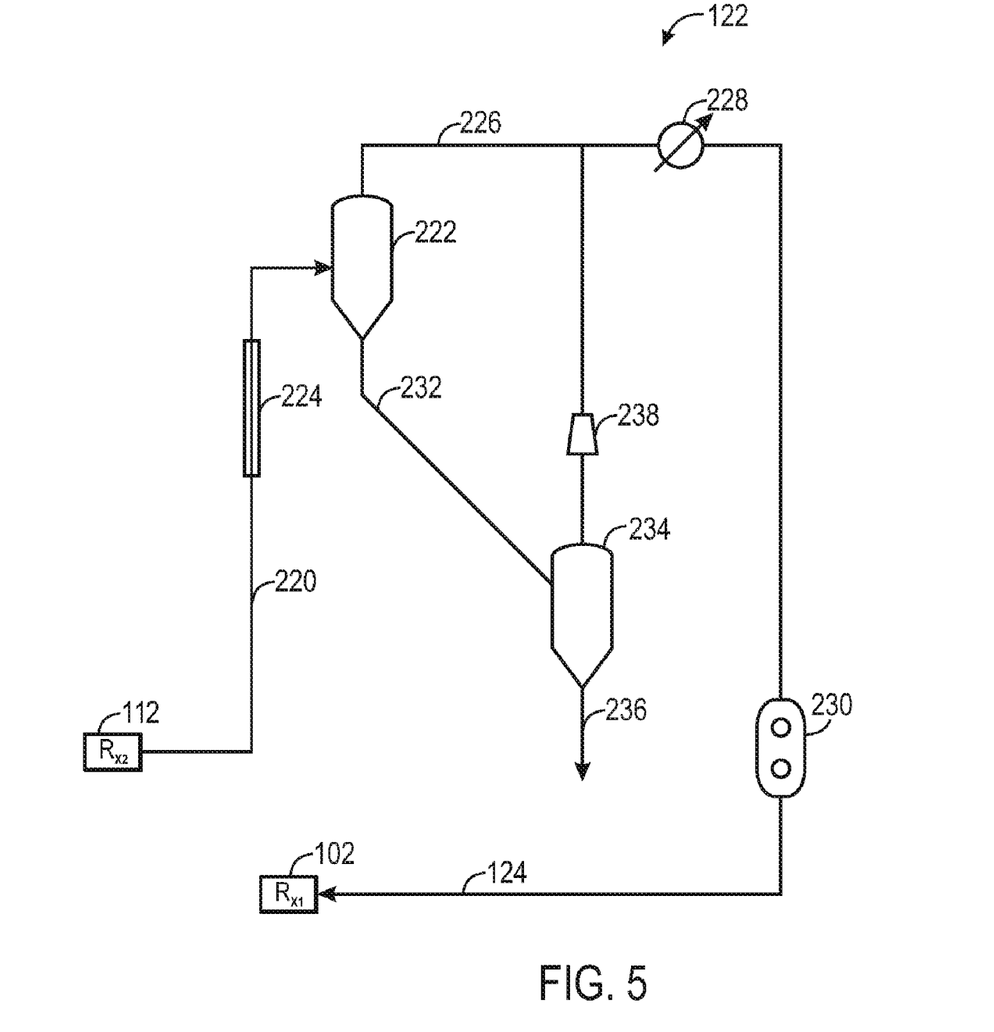
FIG. 5 is an illustration of a flashline for polyolefin recovery and diluent recycle in accordance with an embodiment of the present techniques.

According to the present technique, the systems 100 and 160 both utilize a flashline apparatus 122 for product isolation and diluent recycle. FIG. 5 depicts a typical flashline apparatus 122 embodying such features. The flashline apparatus may include features for isolating the polymer product from the continuously withdrawn product slurry from the second reactor 112 (in the case of series operation) or the first reactor 102 and the second reactor 112 in the case of parallel operation. Regardless of the mode of operation, the slurry, either from the first reactor 102 or second reactor 112, must pass through a common conduit 220 into a high pressure flash chamber 222. Conduit 220 includes a surrounding conduit 224 which is provided with a heated fluid which provides indirect heating to the slurry material in flash line conduit 220. Vaporized diluent exits the flash chamber 222 via conduit 226 for further processing, which may include condensation by simple heat exchange using recycle condenser 228. The diluent then returns to the system 100 (e.g., to an area proximate motive device 128 within the first reactor 102), without the necessity for compression, via line 124 and recycle liquid pump 230. Recycle condenser 228 can utilize any suitable heat exchange fluid known in the art under any conditions known in the art. In some embodiments, a fluid at a temperature that can be economically provided may be used. A suitable temperature range for this fluid is 40° F. to 130° F. Polymer particles are withdrawn from high pressure flash chamber 222 via line 232 for further processing using techniques known in the art. In some aspects, they are passed to low pressure flash chamber 234 and thereafter recovered as polymer product via line 236. Separated diluent passes through compressor 238 to line 226. In some embodiments, the continuous take-offs utilized by a system employing reactors in series (such as system 100) not only allows for higher solids concentration upstream in the first reactor 102, but also allows better operation of the high pressure flash, thus allowing the majority of the withdrawn diluent to be flashed off and recycled with no compression. Indeed, 50 to 99 percent (e.g., 70 to 92 percent) of the diluent may generally be recovered in this manner.

H. Multiple-Reactor System Operation

Figure 6:
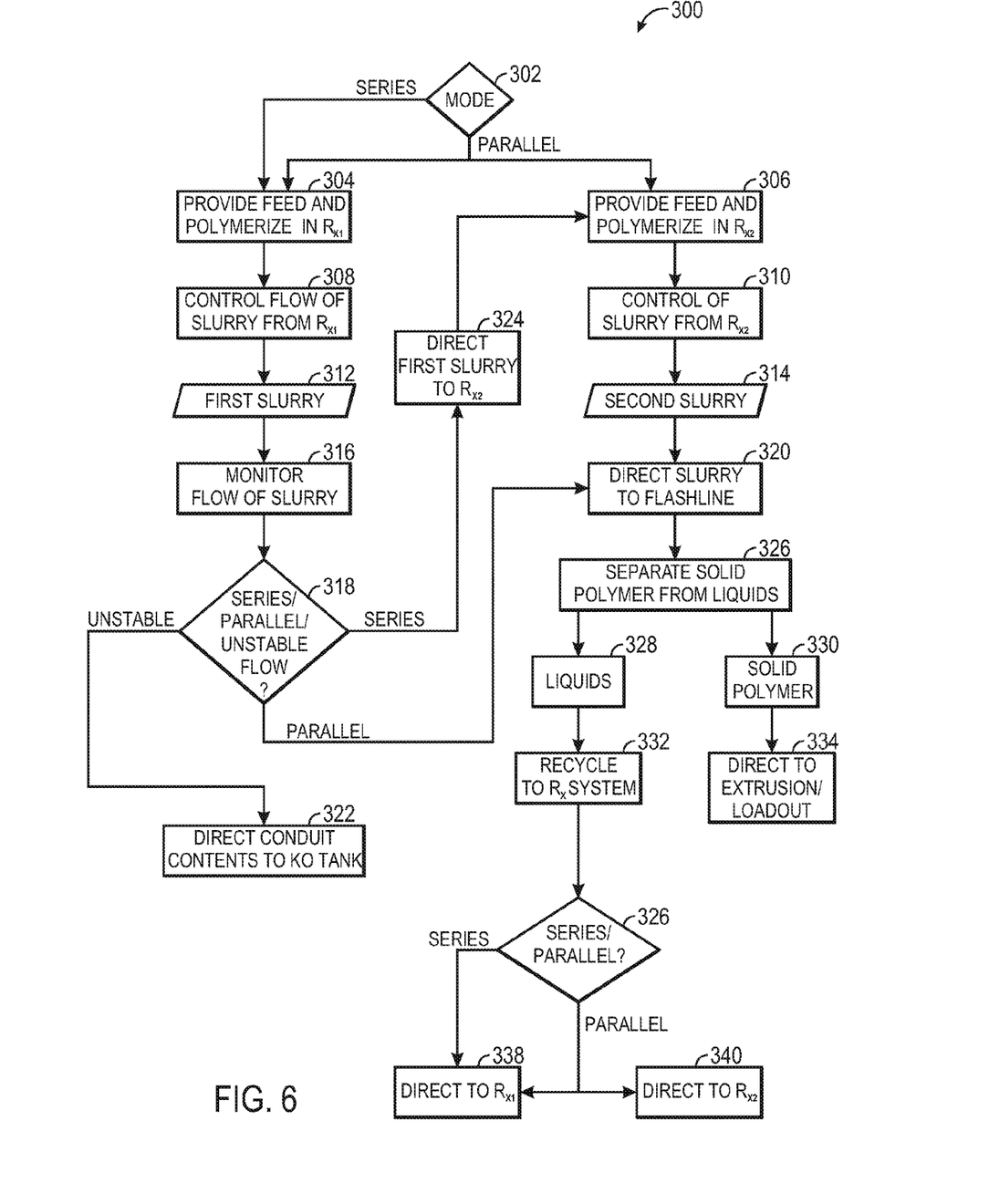
FIG. 6 is a block flow diagram of a method of operating a dual reactor system in accordance with an embodiment of the present techniques.

In accordance with the embodiments thus described, a block flow diagram of a method 300 of operating a dual reactor polymerization system, for example system 100, is depicted in FIG. 6. Additionally, it should be noted that the present method may be applicable to multiple reactors in series (i.e., more than two) and that the present embodiments are directed to the operation of two reactors to facilitate discussion. As depicted and described in FIG. 1, in a general sense, a feed system 16 may feed into the reactor system 20. As shown in FIG. 6, however, it may be necessary to determine the desired operating conditions 302, such as, for example, to determine whether the system will be operated in series or in parallel. In the case of series operation, the overall process may include a step 304 of feed to and polymerization within the first reactor 102. In the case of parallel operation, in addition to step 304, another step 306 of feed to and polymerization within the second polymerization reactor 112 may be performed. In both operational embodiments, the first reactor 102 and the second reactor 112 polymerize their respective monomers to form slurries, and may have steps 308 and 310, respectively, of controlling the rate at which their respective slurries are continuously withdrawn. These steps may include using features such as CTO 104 disposed on the first reactor 102 to control the flow of the first slurry 312 and CTO 116 disposed on the second reactor 112 to control the flow of the second slurry 314.

Referring to the process flow according to the first polymerization reactor 102, the first slurry 312 may be continuously withdrawn from the first polymerization reactor 102 into a conduit, such as, for example, the transfer line 110 or the primary line 164 described in FIG. 4. It should be appreciated that the flow of the first slurry 312 through the transfer line 110 or the primary line 164 may be continuously monitored, according to block 316. As mentioned, a major advantage of operating a dual reactor polymerization system according to the present technique is that the system may be switched between series and parallel operation using the features of steps 308 and 310 and the features described in FIG. 4. Thus, according to an intra-operative determination 318 of series or parallel operation (e.g., if an operator decides to switch the mode of operation), or if a leak or other negative operating factor is detected, the flow of the first slurry 312 may be directed to a number of different pathways. For example, if parallel operation is desired, the flow of the first slurry 312 may be directed, as indicated by step 320, to a flashline (e.g., the flashline 122). In another embodiment, if a leak or other negative operating condition is detected, the first slurry 312 may be directed, according to step 322, to a knockout tank, such as the knockout tank 186 described in FIG. 4. Conversely, if series operation is being performed, the first slurry 312 as indicated by block 324, may continue through the transfer line 110 to the second reactor 112.

It should be appreciated that during parallel operation, the feed and polymerize step 306 may occur substantially simultaneously to step 304, where feed is delivered to and polymerization occurs within the first reactor 102. However, during series operation, the step 306 may follow step 324. That is, the first slurry 312 may be directed to the second reactor 112 according to step 324, followed by introduction of feed into and polymerization of a monomer within the second reactor 112, according to step 306. At this point, the second polymerization reactor 112 may begin to incorporate a new polyolefin into the first slurry 312, forming the second slurry 314. However, it should be appreciated that in the course of parallel operation, the second slurry 314 may not incorporate the first slurry 312.

As mentioned, the process according to the second reactor 112 may include the step 310 for controlling the flow of the second slurry 314 exiting the reactor 112. In certain embodiments, such as those described with respect to FIG. 3, step 310 may also direct features, such as the CTO 116 disposed on the second reactor 112, to modulate the flow of the first slurry 312 exiting the first reactor 102 and/or flowing through the transfer line 110. Nevertheless, the flow of the second slurry 314, which may or may not include the first slurry 312 (depending on the mode of operation), may be directed, according to the aforementioned step 320, to the flashline apparatus 122. For example, during parallel operation, the flashline apparatus 122 will receive the first slurry 312 independently of the second slurry 314. During series operation, the second slurry 314 may incorporate the first slurry 312.

The flashline apparatus 122, as described in FIG. 5, may separate, in a step 326, a liquid medium 328 from a polymer product 330 of the slurry or slurries that have been directed to the flashline apparatus 122. Of course, the liquid medium may be recycled, according to step 332, to the reactor system, such as, for example, system 100. The solid polymer product 330 may be directed, according to step 334, to an extrusion/loadout area for further processing, such as the extrusion/loadout 36 described in FIG. 1. The flashline apparatus 122, to accord with the present technique, may also include features to direct the liquid medium 328 to the first reactor 102, or the second reactor 112, or both. As such, a final determination of series or parallel operation may be made, according to step 336, to determine where the liquid medium 328 may be directed. In the case of parallel operation, the liquid medium 328 may be directed to the first reactor 102, according to step 338, as well as to the second reactor 112, according to step 340. In a series configuration, the liquid medium may be directed to the first reactor 102, rather than both reactors, and as such may consist of performing step 338 rather than steps 338 and 340.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims

What is claimed is:

1. A method of producing a polyolefin, comprising:
   providing a feed comprising a diluent and a first monomer to a first polymerization reactor;
   polymerizing the first monomer in the first polymerization reactor to form a first polyolefin in a first slurry;
   discharging a transfer slurry comprising the first polyolefin and the diluent continuously from the first polymerization reactor to a second polymerization reactor;
   polymerizing a second monomer in the second polymerization reactor to form a second polyolefin in a second slurry;
   discharging the second slurry from the second polymerization reactor; and
   controlling a pressure in the first polymerization reactor and a pressure in the second polymerization reactor by modulating only continuous take-off of the second slurry from the second polymerization reactor along with the feed into the first polymerization reactor.

2. The method of claim 1, wherein the first polyolefin is polyethylene.

3. The method of claim 2, wherein the first polymerization reactor and the second polymerization reactor are similarly sized.

4. The method of claim 1, wherein the first polymerization reactor and the transfer line are substantially free of gravity settling.

5. The method of claim 1, wherein the transfer slurry has a higher average solids concentration than the first slurry.

6. The method of claim 1, wherein the first polymerization reactor is operated under a first set of conditions to produce the first polyolefin having a first molecular weight distribution and the second polymerization reactor is operated under a second set of conditions to produce the second polyolefin having a second molecular weight distribution, and the first and second molecular weight distributions are different.

7. The method of claim 1, wherein the diluent comprises isobutane.

8. The method of claim 1, wherein the diluent comprises propane.

9. The method of claim 8, wherein the first reactor, the second reactor, or a combination of both is operated at least at a critical temperature and/or at least at a critical pressure of fluid reactor contents, the fluid reactor contents comprising all reactor contents.

10. A system for producing a polyolefin, comprising:
    a first polymerization reactor;
    a second polymerization reactor disposed downstream of the first polymerization reactor;
    a conduit fluidly connecting the first polymerization reactor and the second polymerization reactor in series; and
    a continuous take-off device disposed on a downstream segment of the second polymerization reactor and configured to control a flow of a transfer slurry from the first polymerization reactor, through the conduit, and to the second polymerization reactor;
    wherein the ratio of an equivalent length of the conduit to a longest equivalent length of the first polymerization reactor and the second polymerization reactor is 25% to 50%.

11. The system of claim 10, comprising a ram valve with an extension configured such that it is oriented into a downstream flow of a stratified slurry circulating within the first polymerization reactor, wherein the ram valve is angled in a direction towards the downstream flow.

12. The system of claim 10, wherein the continuous take off device is configured to facilitate a flow of the transfer slurry through the conduit using a motive force generated at least partially by a continuous feed of diluent and monomer into the first polymerization reactor.

* * * * *